United States Patent
Arbjerg

(10) Patent No.: US 7,610,935 B2
(45) Date of Patent: Nov. 3, 2009

(54) FLUID CONTROLLER

(75) Inventor: Niels Arbjerg, Sydals (DK)

(73) Assignee: Sauer-Danfoss ApS, Nordborg (DK)

( * ) Notice: Subject to any disclaimer, the term of this patent is extended or adjusted under 35 U.S.C. 154(b) by 689 days.

(21) Appl. No.: 11/448,291

(22) Filed: Jun. 7, 2006

(65) Prior Publication Data

US 2007/0113905 A1 May 24, 2007

(30) Foreign Application Priority Data

Jun. 10, 2005 (DK) .............................. 2005 00854

(51) Int. Cl.
*B62D 5/097* (2006.01)
*B62D 5/09* (2006.01)
*B62D 5/083* (2006.01)

(52) U.S. Cl. ..................... 137/625.24; 60/384; 251/283

(58) Field of Classification Search ............ 137/625.21, 137/625.22, 625.23, 625.24; 251/283; 60/384, 60/387

See application file for complete search history.

(56) References Cited

U.S. PATENT DOCUMENTS

| | | | | | |
|---|---|---|---|---|---|
| 3,528,521 | A | * | 9/1970 | Ellis .......................... | 180/437 |
| 3,564,848 | A | * | 2/1971 | Baatrup et al. ................ | 60/384 |
| 3,819,307 | A | * | 6/1974 | Uppsal ................... | 137/625.24 |
| 4,016,949 | A | * | 4/1977 | Plate et al. .................... | 60/384 |
| 4,043,419 | A | * | 8/1977 | Larson et al. ................. | 60/384 |
| 4,109,679 | A | | 8/1978 | Johnson .................. | 137/596.13 |
| 4,285,643 | A | * | 8/1981 | White .................... | 137/625.24 |
| 4,372,413 | A | * | 2/1983 | Petersen et al. ........ | 137/625.24 |
| 4,558,720 | A | | 12/1985 | Larson et al. .......... | 137/625.24 |
| 4,620,416 | A | * | 11/1986 | Yip et al. ...................... | 60/384 |
| 4,671,747 | A | | 6/1987 | Arbjerg ...................... | 418/61 |
| 4,730,544 | A | | 3/1988 | Jorgensen .................... | 91/467 |
| 4,759,182 | A | * | 7/1988 | Haarstad ...................... | 60/384 |
| 4,804,016 | A | * | 2/1989 | Novacek et al. .............. | 60/384 |
| 5,638,864 | A | | 6/1997 | Haarstad et al. ........ | 137/625.24 |
| 5,730,040 | A | | 3/1998 | Strong .......................... | 91/375 |
| 5,992,458 | A | | 11/1999 | Novacek et al. ........ | 137/625.24 |
| 6,769,249 | B2 | * | 8/2004 | Novacek ...................... | 60/384 |
| 6,769,451 | B2 | * | 8/2004 | Hjelsand ...................... | 60/384 |
| 7,490,626 | B2 | * | 2/2009 | Gehlhoff .............. | 137/625.24 |
| 2003/0217550 | A1 | * | 11/2003 | Catellani ..................... | 60/384 |

* cited by examiner

*Primary Examiner*—John Rivell
(74) *Attorney, Agent, or Firm*—McCormick, Paulding & Huber LLP

(57) ABSTRACT

The invention provides a fluid controller, e.g. for a hydrostatic power steering. The controller comprises a cylindrical valve member cooperating with a housing to define at least one fluid path from a pressure source to a steering cylinder. The valve member is rotatable in the housing and comprises a sleeve and a spool, wherein the spool is rotatable within the sleeve. The fluid flow is metered by a flow meter, and the valve member comprises a plurality of meter ports communicating the fluid between the valve member and the flow meter. To obtain less friction between the sleeve and the housing and between the sleeve and the spool, the meter ports are grouped in two groups in which groups the ports are in mutually fluid communication.

12 Claims, 3 Drawing Sheets

FLUID CONTROLLER

CROSS-REFERENCE TO RELATED APPLICATIONS

Applicant hereby claims foreign priority benefits under U.S.C. § 119 from Danish Patent Application No. PA 2005 00854 filed on Jun. 10, 2005, the contents of which are incorporated by reference herein.

FIELD OF THE INVENTION

The present invention relates to a fluid controller for use in a steering system for a vehicle. In particular, the invention relates to a fluid controller operable to control a flow of a fluid from a source of pressurized fluid to a pressure operated device.

BACKGROUND OF THE INVENTION

Vehicles, and in particular off-highway machinery such as wheel loaders, excavators, dozers, tractors, harvesters and similar heavy duty machines often operate with hydraulic steering systems. Typically, the steering system receives a desired steering input to indicate a desired angular movement of the vehicle. The steering input could be provided by an operator via a steering wheel. In a fluid controller, the steering input is converted into a hydraulic flow to a hydraulic actuator, e.g. a hydraulic cylinder which moves the steering wheels of the vehicle. A fluid controller of the above mentioned kind is disclosed e.g. in U.S. Pat. No. 5,992,458 and in U.S. Pat. No. 5,638,864 wherein the controller is disclosed in combination with an unequal area steering cylinder.

In fluid controllers of the mentioned kind, the valve member generally has a neutral configuration and two operating configurations on opposite sides of neutral, corresponding to a left-turn and a right turn of the vehicle. When the valve member is moved relative to the housing, fluid is initially pumped manually towards the actuator. Due to resistance in the fluid meter, the movement of the valve member relative to the housing also results in movement of the valve member from the neutral configuration to one of the operating configurations whereby a fluid path is opened from the inlet port and thereby from a high pressure pump towards one of the control ports and thereby to the steering cylinder, and from the other control port towards the outlet. In that way, a hydraulic piston may be displaced in a cylinder and the steered element of the vehicle is moved. The fluid controllers can be divided into two essentially different groups, namely a reaction type and a non-reaction type controller. In the reaction type controllers, a closed loop is established when the valve member is in the neutral configuration. In the closed loop, the fluid may bypass the source of pressurised fluid, i.e. bypass the hydraulic pump which creates the steering pressure and also bypass the system reservoir. In the loop, the fluid flows directly from a head end of the cylinder through the controller and towards a rod end of the cylinder, and in practise, this allows the steering wheel to follow the movement of the wheels. In the non-reaction type controller, the passage between the head end and the rod end of the cylinder is closed when the valve member is in the neutral configuration. During normal use of the vehicle, the reaction type controller enables the operator to sense resistance and hindrance on the road and allows movement of the vehicles steering system with no interaction from the operator and therefore facilitates towing of the vehicle.

To control the extent of the displacement, the controllers normally include a fluid meter with chambers which, during rotation of the valve member, expands and contracts to meter the fluid which flows from the inlet towards the control port relative to the extent of rotation of the valve member. The chambers communicate with the valve member via a plurality of meter ports located in an outer surface of the valve member and via corresponding separate openings provided in the housing into each of the chambers. The openings are located in the housing to communicate individually with the meter ports during rotation of the valve member in the housing. In addition to the metering of the fluid, the fluid meter normally facilitates the abovementioned manual pumping of the fluid until the valve member moves from the neutral configuration to the operating configuration and the high pressure pump thereby takes over the movement of the steering cylinder.

The fluid meter comprises a fixed number of chambers, typically seven chambers, and the valve member comprises a larger amount of meter ports which alternatingly, during rotation of the valve member, communicate with individual chambers. Typically, the valve members of existing controllers comprise 12 such ports. In the neutral configuration of the valve member, all 12 meter ports are in no communication with the inlet. When the valve member is moved from the neutral configuration towards one of the operating configurations, a fluid path is opened internally in the valve member from an inlet of the valve member towards every second meter port, and from every other meter port towards a cylinder port which communicate with a corresponding control port of the housing. As the valve member rotates in the housing, each chamber is, by turns, connected to the inlet and to the control port.

Some of the ports communicate with expanding chambers, some of the ports communicate with contracting chambers, and some of the ports are not in communication with the fluid meter. As a result, an uneven pressure may exist in the meter ports, and it has been found that this may result in an increased resistance against rotation of the valve member in the housing.

BRIEF SUMMARY OF THE INVENTION

It is an object of the invention to improve the existing fluid controllers and in particular, it is an object to reduce the friction between the valve member and the housing. Accordingly, the invention provides a fluid controller wherein every second one of the meter ports are in mutual fluid communication to form a first group of meter ports and the remaining meter ports are in mutual fluid communication to form a second group of meter ports.

Due to the communication between the meter ports, an essentially equal pressure can be established in all meter ports which are connected to the inlet and correspondingly in all meter ports which are connected to the control port. Due to the equal pressure, the valve member may be balanced more equally in the housing and it has been found that the friction against movement of the valve member in the housing can be reduced.

For a general understanding of hydrostatic power steering and control devices of the kind mentioned in the introduction, reference is made to U.S. Pat. No. 5,638,864, U.S. Pat. No. 5,992,458, U.S. Pat. No. 4,671,747 and U.S. Pat. No. 4,730,544, the last mentioned two references hereby being incorporated by reference.

The valve member may comprise a cylindrical sleeve with an outer surface which faces towards the housing and which, during rotation of the valve member, slides in a bore of the housing. The sleeve may further have an inner surface towards a cylindrical spool which is rotatable within the sleeve between a neutral position and first and second operating positions oppositely disposed about the neutral position. The sleeve may comprise passages extending through the sleeve from the housing to the spool. The passages transport fluid from annular channels and ports in the housing towards the spool depending on the position of the sleeve relative to the housing. The spool may comprise axial slots extending in the spool and communicating fluid between the passages of the sleeve depending on the position of the spool relative to the sleeve. In the first and second operating positions, the valve member is configured to establish a passage between the inlet and one of the control ports and between the other control port and the outlet, respectively. The meter ports may form passages extending radially in the sleeve between the inner surface and the outer surface. A first group of the passages could be joined by a first connecting groove and a second group of the passages could be joined by a second connecting groove. Appropriate for the fluid flow is to provide the passages with larger cross sectional size at the outer surface than at the inner surface. The passages may have a circular cross sectional shape at the inner surface and a quadrangular cross sectional shape at the outer surface. In particular, the meter ports may be arranged in an annular configuration radially around the outer surface of the sleeve, and to establish fluid communication between the meter ports of the first and second group, connecting grooves may be provided in the form of depressions in the outer surface of the sleeve, e.g. located axially on each side of the annularly configured meter ports.

In the embodiment of the fluid controller wherein the valve member comprises a sleeve and a spool which rotates inside the sleeve, the communication between meter ports in the first and second group of ports may further have the advantage of establishing a more homogeneous pressure between the spool and sleeve and thereby reduce the friction against movement of the spool relative to the sleeve.

In a preferred embodiment, the controller is adapted for load reaction steering of a vehicle. In particular, the axial slots of the sleeve and the cooperating passages of the spool and annular chambers and ports of the housing may cooperate to establish a closed loop when the valve member is in the neutral configuration. In the closed loop, the fluid can be bypassed from the first control port, through the fluid controller to the second control port. To establish such a bypassing, the spool may, in a manner known in the art, comprise a set of two axial slots, one of which communicating with the first control port and a first meter port, and the other one communicating with the second control port and a second meter port being adjacent the first meter port. In the known fluid controllers, c.f. e.g. U.S. Pat. No. 5,992,458 these two axial slots are located adjacently in the outer surface of the spool. In connection with load steering of this kind, the communication between meter ports according to the present invention may advantageously be provided by grooves in the outer surface of the sleeve so that the above mentioned two axial slots do not become connected by the grooves. In other cases, the meter ports may be connected in accordance with the present invention by grooves which are formed in the outer surface of the spool or formed in the inner surface of the sleeve.

In a second aspect, the invention provides a valve member for a fluid controller, the valve member comprising an inlet opening, a tank opening, a first control opening, a second control opening, and a plurality of meter ports for communication of fluid between a fluid meter and the valve member, the valve member being provided for a neutral configuration and for first and second operating configurations in which operating configurations the valve member defines a path between the inlet opening and a first group of meter port and from a second group of meter port to one of the control openings and from the other control opening to the tank openings, wherein the meter ports of the first group of meter ports are in fluid communication and the meter ports of the second group of meter ports are in fluid communication. The second aspect can be combined with any of the features disclosed in relation to the first aspect of the invention, and in particular, the valve member may comprise a sleeve and a spool which rotates in the sleeve. The openings may be provided in an outer surface of the sleeve, and the communication between the meter ports of the first group and between the meter ports of the second group may be facilitated by grooves in this outer surface of the sleeve.

BRIEF DESCRIPTION OF THE DRAWINGS

In the following, a preferred embodiment of the invention will be described in further details with reference to the drawing in which.

DETAILED DESCRIPTION OF THE INVENTION

Figure 1:
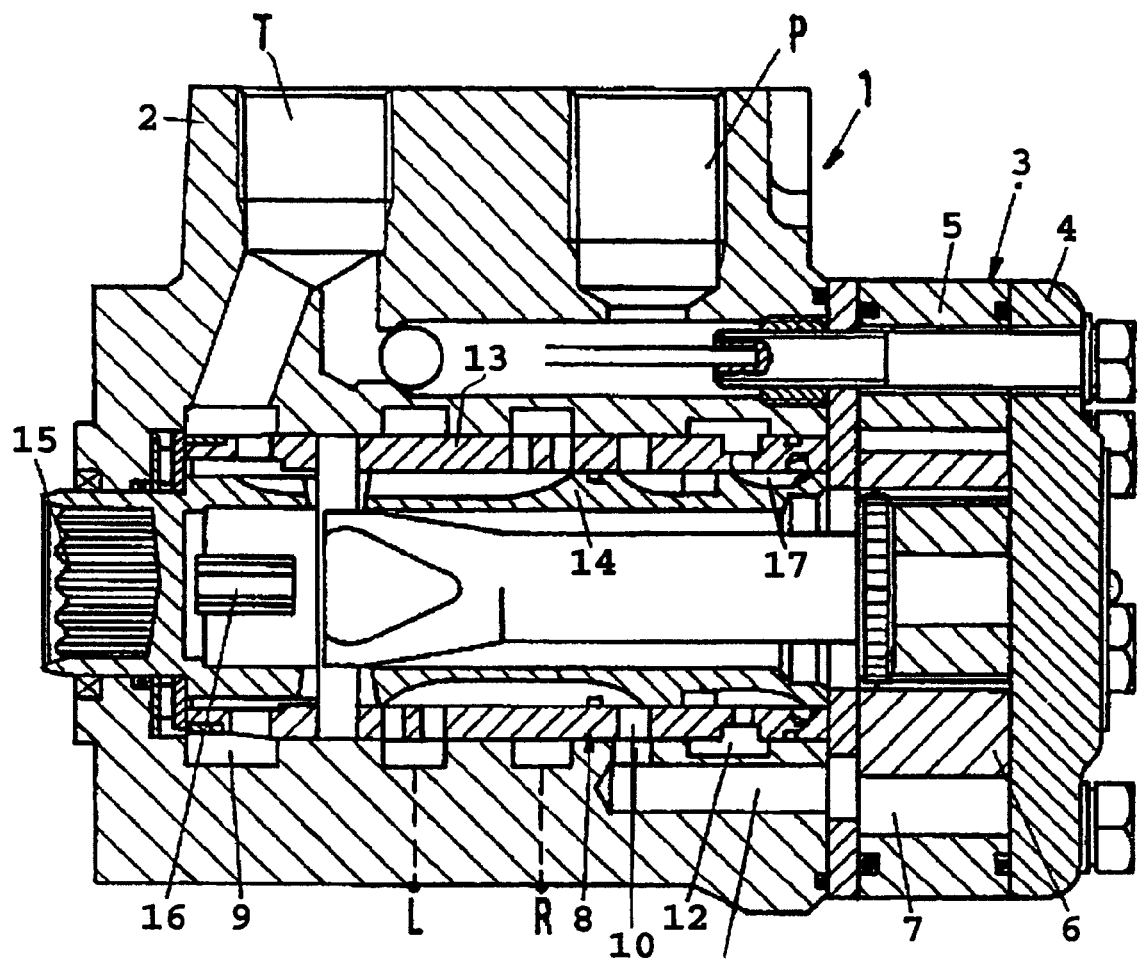
FIG. 1 diagrammatically illustrates a control device.

FIG. 1 illustrates a control device 1 comprising a housing 2, a fluid meter 3, and an end plate 4. The inlet P is connected to a pump and the outlet T is connected to a system reservoir from which the pump receives the fluid. The control ports are not visible in the shown cross section but the letters L and R point at annular chambers to which the control ports are in communication. The fluid meter 3 comprises a stationary gear ring 5 having internal teeth, and a rotating and planetary gear 6 having external teeth. The gears form volume chambers 7 which expand and contract during the movement of the external teeth between the internal teeth.

A valve member 8 is rotatably disposed in the housing in which an annular chamber 9 is in communication with the outlet T. L is connected to a head end of a steering cylinder and R is connected to a rod end of the steering cylinder via control ports which as aforementioned are not shown in FIG. 1. A plurality of meter ports 10 provided in the valve member 8 communicate between the volume chambers 7 via the axial passages 11 which are provided in the housing. The annular chamber 12 is in communication with the inlet P and thereby with the fluid under pressure delivered by the pump.

The valve member 8 comprises a sleeve 13 and a spool 14. The spool comprises a coupling end 15 which is driven by the operator of a vehicle via a drive wheel. The spool and the sleeve can be turned relatively to each other through a predetermined angle in both directions out of a neutral position against the force of radial leaf springs 16. The planetary gear 6 and thereby the displacement of the fluid out of the chambers of the fluid meter is driven by the sleeve via a pin and a cardan shaft 17 connected between the sleeve and the planetary gear. When the resistance against the displacement of the fluid exceeds the rigidity of the spring 16, the sleeve starts to slip and rotates relative to the spool whereby the spool moves from the neutral configuration to an operating configuration whereby the valve member establishes a passage between the inlet P and one of the control ports (L, R) and between the other control port and the outlet T, respectively.

Figure 2:
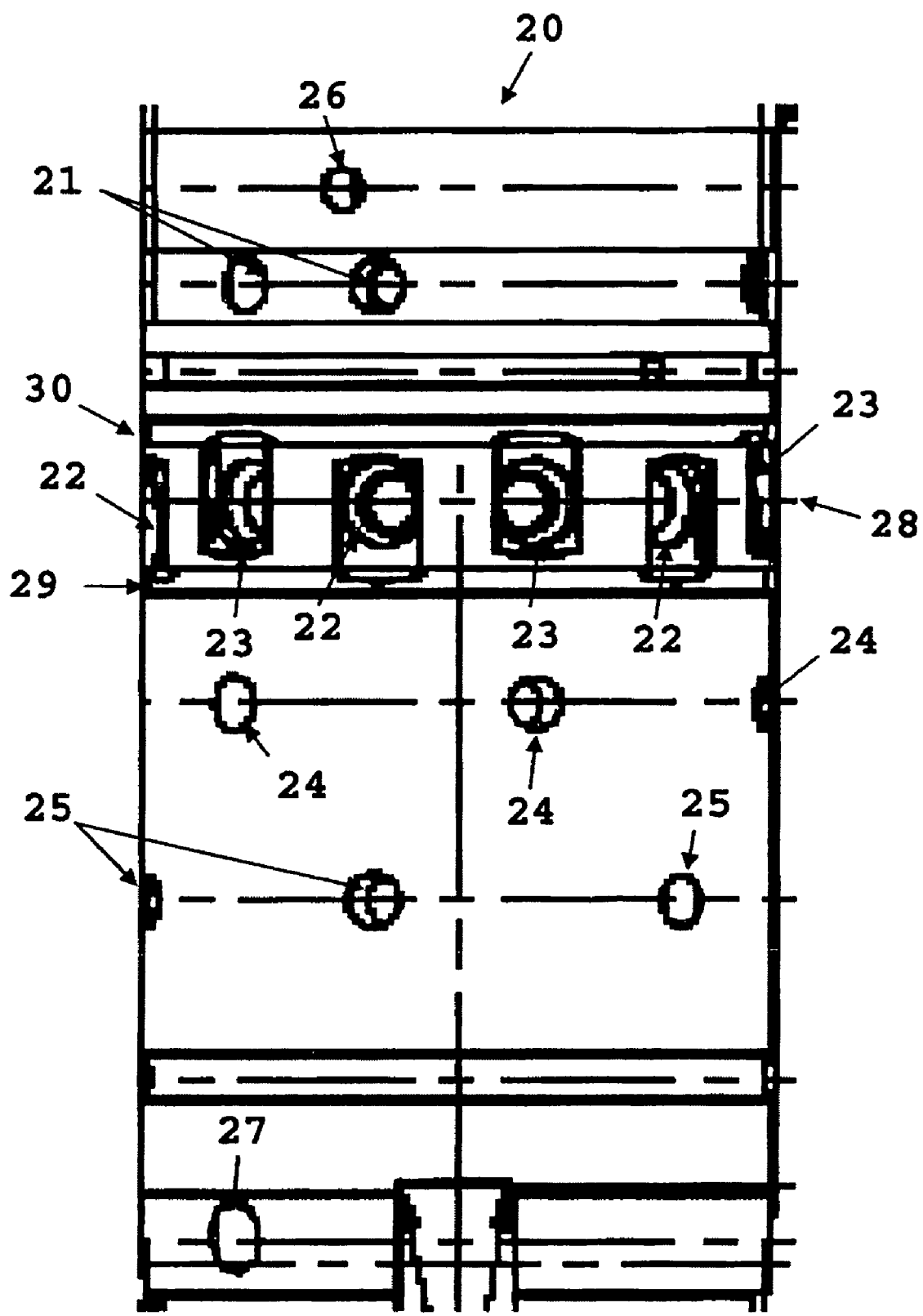
FIG. 2 illustrates a valve member.

FIG. 2 illustrates a valve member 20, and in particular, the outer surface of a sleeve of a valve member. The surface forms a plurality of pressure ports 21 in communication with the annular chamber 12 and thereby in communication with the inlet P. Next to the pressure ports 21, the valve member comprises a plurality of meter ports 22 of a first group of meter ports which communicate between the valve member 8, 20 and the volume chambers 7, cf. FIG. 1, and a plurality of meter ports 23 of a second group of meter ports which communicate between the valve member 8, 20 and the volume chambers 7.

Next to the meter ports is a plurality of first cylinder ports 24 in communication with the annular chamber R and a plurality of second cylinder ports 25 in communication with the annular chamber L. The sleeve further defines a plurality of centre ports 26 which communicate with the inlet P and a plurality of tank ports 27 which communicate with the outlet.

The ports of one type are arranged in an annular configuration around the periphery of the sleeve at one axial location of the sleeve, indicated by the line 28. The meter ports form openings with a quadrangular cross sectional shape in the outer surface of the sleeve and the openings have larger cross sectional size in the outer surface than in the inner surface. Every second port (more ports exist without being visible in FIG. 2) belongs to a first group and they are in communication via the first groove 29 extending circumferentially in the outer surface and being axially displaced relative to the meter ports. Correspondingly, every other port (more ports exist without being visible in FIG. 2) belongs to a second group and they are in communication via the second groove 30 extending circumferentially in the outer surface. The second groove 30 is axially displaced to an opposite side of the meter ports relative to first groove 29.

Figure 3:
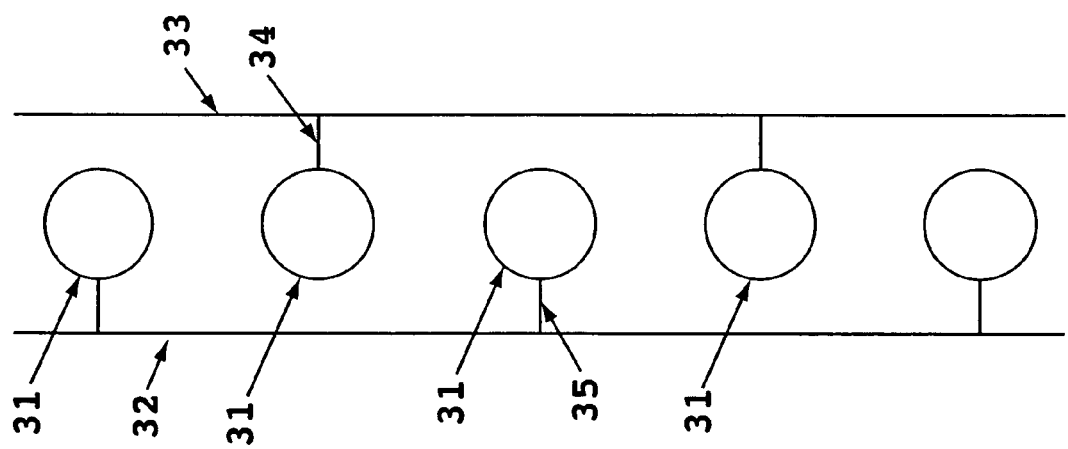
FIG. 3 illustrates a view of an alternative shape of the meter ports.

FIG. 3 shows a view of an alternative shape of the meter ports 31 wherein the opening in the outer surface of the sleeve has a circular cross sectional shape. The meter ports are connected to one of the first groove 32 and second groove 33, respectively, via connecting grooves 34, 35.

Figure 4:
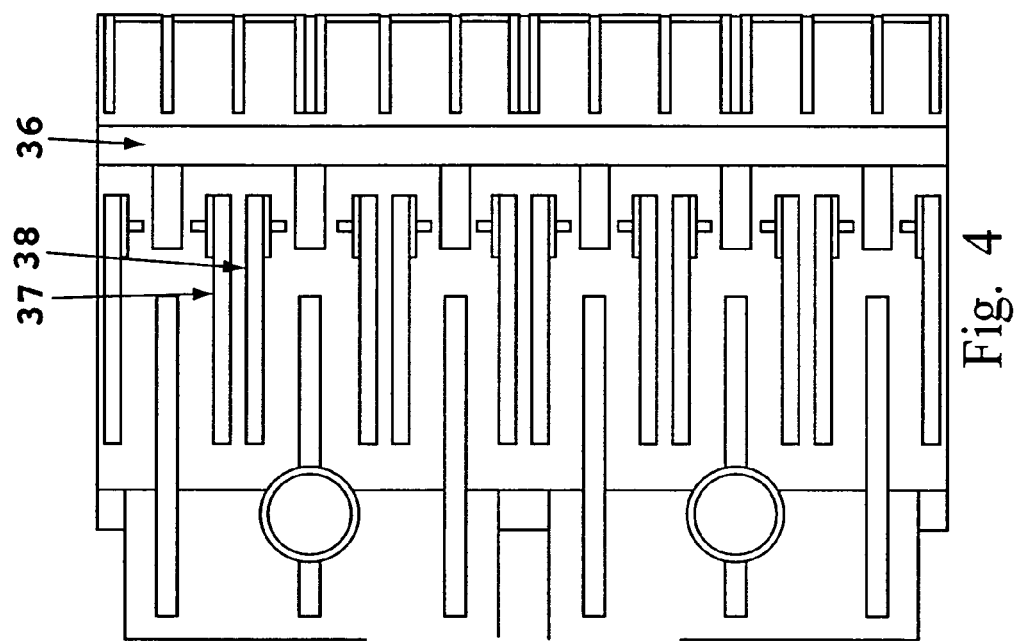
FIG. 4 illustrates the surface of a spool for a valve member.

FIG. 4 illustrates an outer surface of a spool adapted to move inside a sleeve, e.g. of the kind disclosed in FIG. 3. The surface comprises a number of slots which communicate between the openings in the sleeve. The annular slot 36 is in communication with the pressure ports 21, and the two axial slots 37, 38 are located adjacently. One of the slots communicate between a meter port 22 and a first control port 24 while the other slot communicate between an adjacent meter port 23, i.e. a meter port from another group of meter ports and a second control port 25, c.f. also FIG. 2. A closed loop may therefore be established when the valve member is in the neutral configuration. In the closed loop, the fluid may bypass the source of pressurised fluid, i.e. bypass the hydraulic pump which creates the steering pressure and also bypass the system reservoir, and the disclosed arrangement of the slots 37, 38 therefore facilitates a reaction type steering. By connecting the meter ports by grooves in an outer surface of the sleeve rather than in an inner surface of the sleeve or in an outer surface of the spool, communication directly between the slot 37 and 38 can be avoided and this location of the connecting grooves in an outer surface of the sleeve is therefore preferred in load reaction steering systems.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A fluid controller operable to control a flow of a fluid from a source of pressurized fluid to a pressure operated device, the controller comprising:
   a housing defining an inlet port connected to the source, an outlet port connected to a system reservoir, a first control port connected to a first port of the pressure operated device, and a second control port connected to a second port of the pressure operated device,
   a fluid meter with expanding and contracting volume chambers, and
   a cylindrical valve member being rotatable within the housing and cooperating therewith to define at least one fluid path from the inlet port to one of the control ports, and from the other control port to the outlet port, the valve member comprising a plurality of meter ports communicating the fluid between the valve member and the expanding and contracting volume chambers, wherein every second of the meter ports are in fluid communication to form a first group of meter ports and the remaining meter ports are in fluid communication to form a second group of meter ports.

2. The controller according to claim 1, wherein the valve member comprises a cylindrical sleeve and a cylindrical spool which is rotatable within the sleeve between a neutral position and first and second operating positions oppositely disposed about the neutral position.

3. The controller according to claim 2, wherein the meter ports form passages extending radially in the sleeve between an inner surface towards the spool and an outer surface towards the housing, a first group of the passages being joined by a first connecting groove and a second group of the passages being joined by a second connecting groove.

4. The controller according to claim 3, wherein the passages have a larger cross sectional size at the outer surface than at the inner surface.

5. The controller according to claim 3, wherein the passages have a circular cross sectional shape at the inner surface and a quadrangular cross sectional shape at the outer surface.

6. The controller according to claim 3, wherein the meter ports are arranged in an annular configuration along the outer surface of the sleeve.

7. The controller according to claim 6, wherein the first connecting groove is located axially on one side of the meter ports and the second connecting groove is located axially on an opposite side of the meter ports.

8. The controller according to claim 3, wherein the connecting grooves form depressions in the outer surface of the sleeve.

9. The controller according to claim 1, wherein the first group in one position of the valve member relative to the housing, is communicating with a contracting chamber and the second group is communicating with an expanding chamber.

10. The controller according to claim 1, adapted for load reaction steering of a vehicle.

11. A valve member for a fluid controller, the valve member comprising an inlet opening, a tank opening, a first control opening, a second control opening, and a plurality of meter ports, the valve member being provided for a neutral configuration and for first and second operating configurations in which operating configurations the valve member defines a path between the inlet opening and a first group of meter port and from a second group of meter port to one of the control openings and from the other control opening to the tank openings, wherein the meter ports of the first group of meter ports are in fluid communication and the meter ports of the second group of meter ports are in fluid communication.

12. The valve member according to claim 11, comprising a sleeve and a spool which rotates in the sleeve, the openings being provided in an outer surface of the sleeve, and the communication between the meter ports of the first group and between the meter ports of the second group being provided by grooves in the outer surface.

* * * * *